(12) United States Patent
Vigroux et al.

(10) Patent No.: US 8,064,131 B2
(45) Date of Patent: Nov. 22, 2011

(54) DEVICE FOR AMPLIFYING HIGH-ENERGY ULTRASHORT LIGHT PULSES

(75) Inventors: Luc Vigroux, Montlhery (FR); Pierre Mary Paul, Draveil (FR); Federico Canova, Paris (FR); Gilles Riboulet, Morsang sur Orge (FR)

(73) Assignee: Amplitude Technologies, Lisses (FR)

( * ) Notice: Subject to any disclaimer, the term of this patent is extended or adjusted under 35 U.S.C. 154(b) by 383 days.

(21) Appl. No.: 12/435,513

(22) Filed: May 5, 2009

(65) Prior Publication Data

US 2009/0279167 A1    Nov. 12, 2009

(30) Foreign Application Priority Data

May 5, 2008   (FR) ..................... 08 52980

(51) Int. Cl.
*H01S 4/00* (2006.01)
*H01S 3/10* (2006.01)

(52) U.S. Cl. ........... 359/348; 359/339; 359/347; 372/25

(58) Field of Classification Search .................. 359/347, 359/348, 339; 372/25
See application file for complete search history.

(56) References Cited

U.S. PATENT DOCUMENTS

| | | | | |
|---|---|---|---|---|
| 5,400,350 | A * | 3/1995 | Galvanauskas | 372/20 |
| 5,867,305 | A * | 2/1999 | Waarts et al. | 359/337.12 |
| 7,430,351 | B2 | 9/2008 | Albert et al. | |
| 2005/0008044 | A1* | 1/2005 | Fermann et al. | 372/19 |
| 2005/0265407 | A1 | 12/2005 | Braun et al. | |

FOREIGN PATENT DOCUMENTS

EP    1 662 306    5/2006

OTHER PUBLICATIONS

Jullien et al. "Highly efficient XPW temporal contrast filter for ultra intense femtosecond pulses", in Lasers and Electro-Optics, 2006 and 2006 Quantum Electronics and Laser Science Conference, JThA6. pdf (Published May 2006).*
J. Itatani et al., "Suppression of the amplified spontaneous emission in chirped-pulse-amplification lasers by clean high-energy seed-pulse injection", Optics Communications, Mar. 1998, pp. 70-74, vol. 148, Elsevier Science B.V.
P. Maine et al., "Generation of Ultrahigh Peak Power Pulses by Chirped Pulse Amplification", IEEE Journal of Quantum Electronics, Feb. 1988, pp. 398-403, vol. 24, No. 2, IEEE.
Koichi Yamakawa et al., "Generation of a High-Energy Picosecond Laser Pulse with a High-Contrast Ratio by Chirped-Pulse Amplification", IEEE Journal of Quantum Electronics, Feb. 1991, pp. 288-294, vol. 27, No. 2, IEEE.
A. Jullien et al., "Temporal contrast enhanced to 10-10 for Petawatt scale femtosecond lasers", 2005 Quantum Electronics and Laser Conference (QELS), pp. 2015-2017.
A. Cotel et al., "Nonlinear temporal pulse cleaning of a 1-um optical parametric chirped-pulse amplification system", Applied Physics B, Lasers and Optics, 2006, pp. 7-10, vol. 83.

* cited by examiner

*Primary Examiner* — Eric Bolda
(74) *Attorney, Agent, or Firm* — Young & Thompson

(57) ABSTRACT

A device for amplifying high-energy ultrashort light pulses, includes a generator (1), a first amplifying/time-stretching element (2) including a time-stretching element (3), a regenerative amplifier (4), a multipass amplifier (5) and a compressor (6). The device further includes a second amplifying/time-stretching element (11), arranged at the output of the generator (1), amplifying and time-stretching the initial light pulses (7) to generate amplified and time-stretched pulses (13), and a filtering element (12) arranged between the second amplifying/time-stretching element (11) and the amplification unit (2), blocking the low-amplitude light signals (14) of the amplified and time-stretched pulses (13).

9 Claims, 4 Drawing Sheets

Prior Art	Figure 1

DEVICE FOR AMPLIFYING HIGH-ENERGY ULTRASHORT LIGHT PULSES

The present invention relates to a device for improving the Signal-to-Noise ratio during amplification of high-energy ultrashort light pulses.

As used herein, "high-energy ultrashort light pulses" means light pulses shorter than one picosecond (1 ps= $10^{-12}$ s), having energies of the order of the nanojoule ($10^{-9}$ Joules).

Since Ippen and Shank made the first laser emitting pulses shorter than one picosecond in 1974 [Appl. Phys. Letters; 24, (1974) 373], the duration of the laser pulses has not stop to decrease. Lasers generating pulses whose duration is shorter that one picosecond are known as "ultrashort lasers". The ultrashort pulses generated allow a temporal study of the dynamics of ultrafast processes (shorter that $10^{-10}$ s) up to now inaccessible to most of the sensors.

The existence of such ultrashort light sources has opened up new fields of investigation and application, such as in the processes of fragmentation and/or desorption of adsorbed molecules, in metrology, etc.

For some of those applications, the high-energy ultrashort pulses have to be amplified to obtain peak powers E/Δτ (with the energy E in Joules and the pulse duration Δτ in picoseconds) that can reach several tens of Terawatts and that produce, when the beam is focused on a target, light intensities greater than $10^{17}$ Watts/cm$^2$.

Such amplifications are performed through optical amplifiers (or laser amplifiers). These latter are generally made of a gas, solid or liquid containing an active atom which is "electronically energized" using a light energy (photon) or electric energy (electron). Amplification of light is obtained by "stimulated" deenergization of this atom.

Amplifier mediums based on rare-earth ions (Ytterbium (Yb), Neodymium (Nd) . . . ) are known that form the active medium which is associated with a glass matrix or YAG ($Y_3Al_5O_{12}$). Multipass Ti-Sapphire amplifiers are also known.

Directly amplifying ultrashort pulses to high levels of energy is difficult or even impossible. The high peak power of a high-energy ultrashort pulse would result almost certainly in damages of the optical elements located in the amplifier cavity.

To solve this problem, a commonly-used method is the "Frequency Shift Amplification", also known as CPA (for "Chirped Pulse Amplification"), the device of which, comprising a first stretching/amplifying means 2, is shown in FIG. 1.

The initial high-energy light pulses 7 generated by a generator 1 are time-stretched by a time-stretching means 3 ("stretcher"), up to durations comprised between a few tens of picoseconds and a few nanoseconds. This produces time-stretched light pulses 8, which can next be amplified by a regenerative amplifier 4 and a multipass amplifier 5 without risk for these latter to be deteriorated. The amplified light pulses 9 are then subjected to a reverse operation of time-compression through a compressor 6, which generates compressed light pulses 10 whose duration is close to the initial duration.

Such technique thus allows to obtain light pulses having significant peak powers (several hundreds of Terawatts). It can be noted that, in principle, the spectral characteristics of the pulses are not affected by the above technique.

The difficulty resides in obtaining at the compressor output only the desired pulses, i.e. those having the highest amplitudes, with very high Signal-to-Noise ratio and contrast.

As mentioned above, certain high-energy ultrashort light pulses have peak powers E/Δτ that can reach several hundreds of Terawatts. When the laser beam is focused on a target at light intensities greater than $10^{17}$ Watts/cm$^2$, low-amplitude parasitic signals (for example, $10^6$ times smaller than the pulses) result in significant light intensities liable to involve physical processes greatly disturbing the beam/matter interaction.

It is therefore necessary to ensure the highest possible Signal-to-Noise ratio or contrast. The search for contrast improvement is thus permanent, and the results currently do not exceed $10^7$:1 or $10^8$:1. The contrast required by laser users has to be capable of reaching more than $10^{10}$:1.

Active components are known, such as electro-optical cells acting as fast-opening optical gates that let through only high-amplitude light signals, but the opening and closing times of these cells are of a few hundreds of picoseconds, and hence do not permit to eliminate on both sides of the pulse the light noise brought by the spontaneous emission or ASE ("Amplified Spontaneous Emission").

Therefore, the present invention aims to provide a device which can be integrated in a chain for amplifying high-energy ultrashort light pulses, for obtaining high contrasts, greater than $10^8$:1, and that can reach more than $10^{14}$:1.

For that purpose, the invention relates to a device for amplifying high-energy ultrashort light pulses, comprising:
- a generator supplying initial high-energy ultrashort light pulses,
- a first amplifying/time-stretching means, comprising:
    - a time-stretching means adapted to time-stretch light pulses to generate time-stretched light pulses,
    - a regenerative amplifier pre-amplifying the time-stretched light pulses to generate stretched and pre-amplified light pulses,
    - a multipass amplifier amplifying the stretched and pre-amplified light pulses to generate amplified pulses,
    - a compressor time-compressing the amplified pulses to generate compressed pulses having a duration close to that of the initial light pulses, and
- a second amplifying/time-stretching means, arranged at the output of the generator, suitable for amplifying and time-stretching light pulses for generating time-stretched light pulses.

According to the invention, the device for amplifying high-energy ultrashort light pulses comprises:
- a first filtering means comprising a passive component, said passive component comprising at least one saturable absorbent material, said first filtering means being arranged between the second amplifying/time-stretching means and the first amplifying/time-stretching means and being suitable for blocking the low-amplitude light signals of the amplified and time-stretched pulses,
- a second compression means, arranged after the first filtering means, and a second filtering means arranged after the second compression means, said second filtering means comprising a non-linear crystal suitable for transferring a part of the energy of the compressed pulses to a cross-polarization (XPW) and a polarizer suitable for filtering said polarization.

In various possible embodiments, the present invention also relates to the features that will appear from the following description and that should be considered either alone or in any technically possible combination:
- the saturable absorbent material is chosen among a CdSe-, CdTe- or CdSeTe-doped glass or a cell of liquid organic dye comprising $C_{29}H_{33}N_2I$ (or HITC), the second amplifying/time-stretching means is a multipass amplifier, the multipass amplifier comprises a dispersive element, the dispersive element is a $TeO_2$ crystal, the second amplifying/time-stretching means is a chirped pulse amplifier.

The invention will now be described in more details with reference to the appended drawings, in which.

Figure 3:
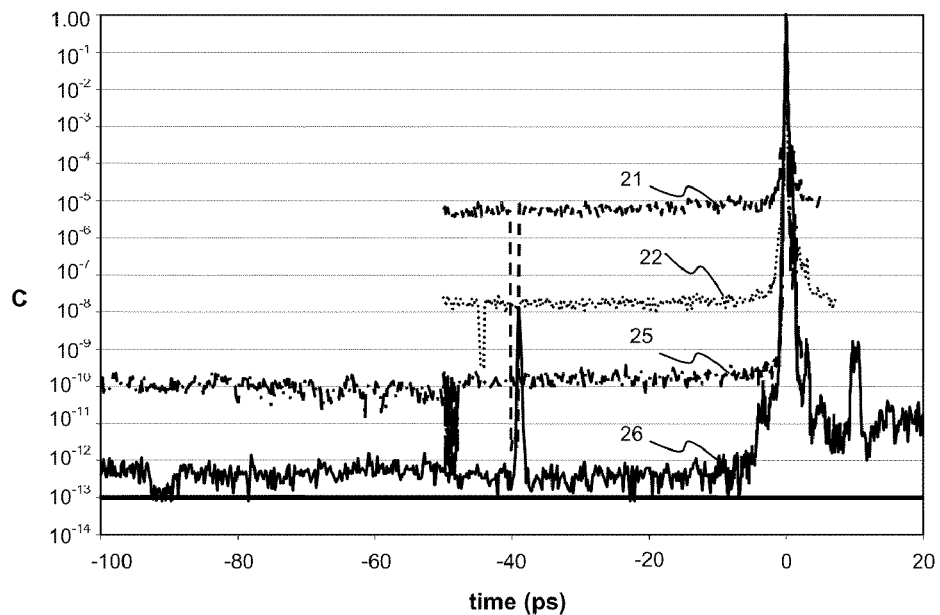
Figure 5:
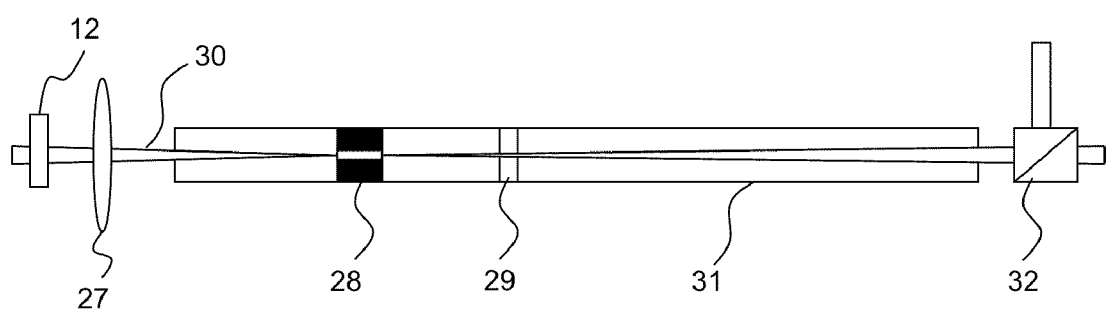
Figure 4:
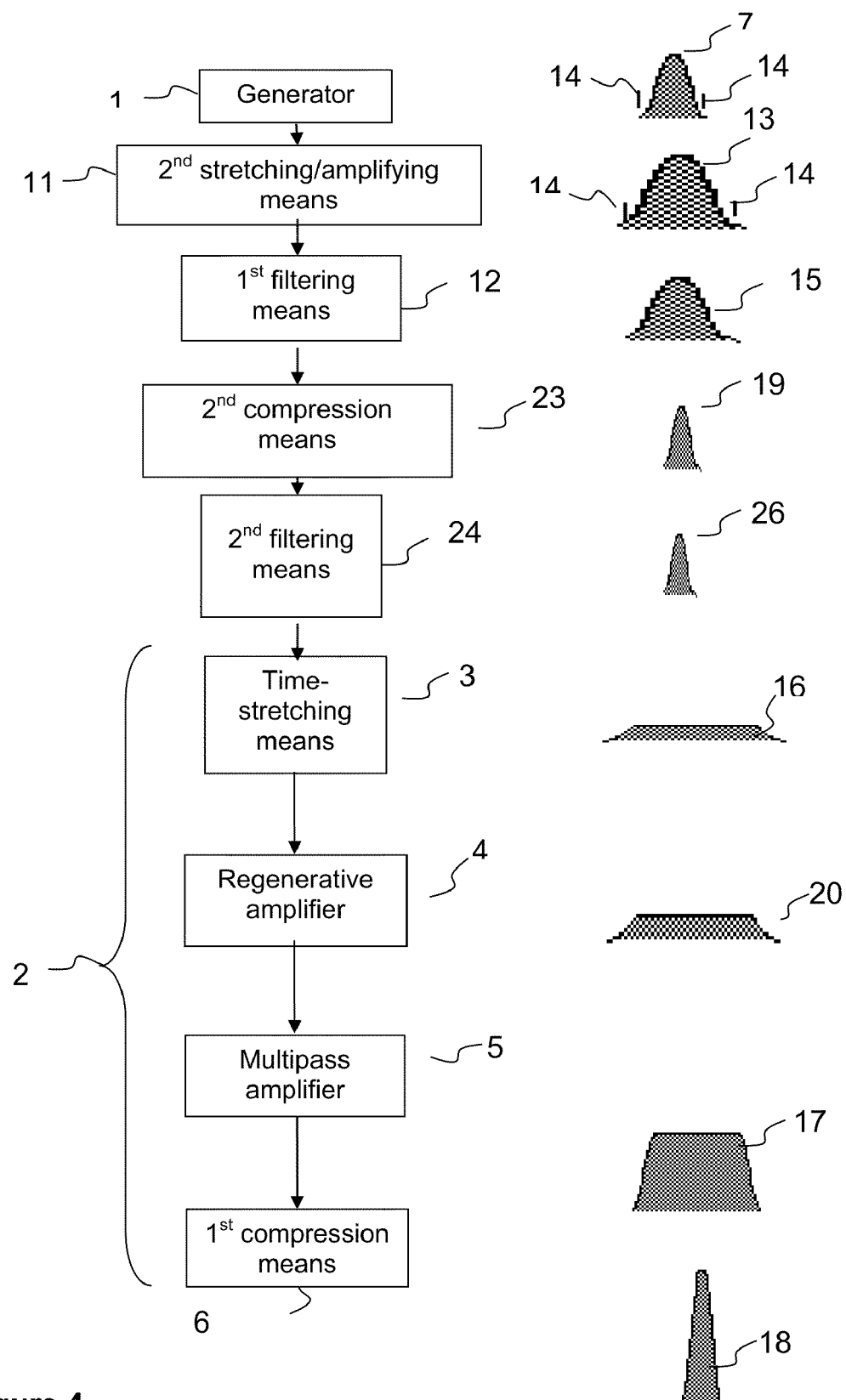

FIG. 3 shows curves of pulse contrast allowing to compare four ultrashort light pulses, obtained with an amplifier device according to the prior art (curves 21, 22 and 25) and with an amplifier device according to a preferred embodiment of the invention (curve 26), respectively;

FIG. 4 shows a preferred embodiment of the device according to the invention;

FIG. 5 schematically shows a preferred embodiment of the filtering means according to the invention.

Figure 2:
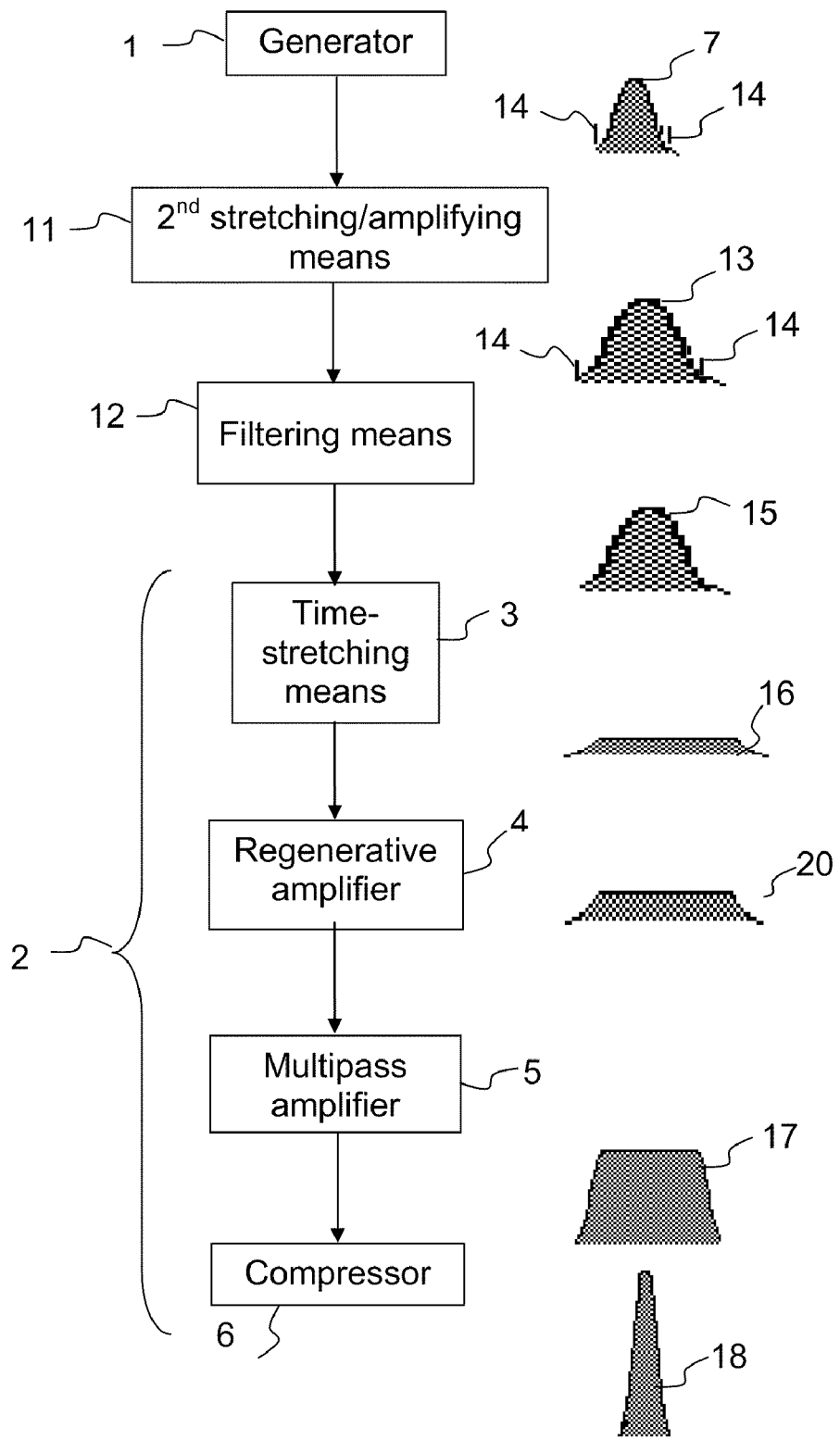
FIG. 2 shows a device for amplifying high-energy ultrashort light pulses according to an embodiment of the invention.

FIG. 2 shows a device for amplifying high-energy ultrashort light pulses, comprising a generator 1 supplying initial high-energy ultrashort light pulses 7. Said initial light pulses 7 generally have a duration of a few femtoseconds. They can also be of the order of the picosecond. They generally comprise noise-forming low-amplitude parasitic signals 14.

According to the embodiment of the invention shown in FIG. 2, the device for amplifying high-energy ultrashort light pulses comprises a second amplifying/time-stretching means 11 arranged a the output of the generator 1. It is operable to amplify and time-stretch the initial light pulses 7 of a few picoseconds.

The second amplifying/time-stretching means 11 can be a multipass amplifier comprising a Ti-Sapphire crystal. In this embodiment, the multipass amplifier also comprises a dispersive element.

The successive passing of the light pulses through said multipass amplifier provides a time-stretching by time-dispersion through the dispersive element. This produces amplified and time-stretched pulses 13 of the order of a few picoseconds, having energies of a few microjoules to 200 microjoules.

The second amplifying/time-stretching means 11 can be a device using the chirped pulse amplification method, knows as CPA, as described above.

The amplified and time-stretched pulses 13 also have low-amplitude parasitic signals 14.

To eliminate these latter, a filtering means 12 is arranged between the second amplifying/time-stretching means 11 and the first amplifying/time-stretching means 2. It is operable to block the low-amplitude parasitic signals 14 of the amplified and time-stretched pulses 13.

Said filtering means 12 can comprise a specific passive component such as a saturable absorbent material which acts as a temporal and spectral gate, the opening of which is actuated depending on the received light intensity. As a material liable to act as a saturable absorbent, it can be mentioned the CdSe-, CdTe- or CdSeTe-doped glass, commercially known as high-pass RG filter (RG850, RG1000 . . . ), or a cell of liquid organic dye, such as $C_{29}H_{33}N_2I$ (or HITC).

As used herein, "passive component" means any component that does not need an energy source other than that of the amplified and time-stretched pulses 13.

The saturable absorbent is a material made of atoms that have several energy levels. In the linear absorption condition, by absorbing the energy supplied by the amplified and time-stretched pulses 13, the atoms are excited toward upper energy levels. Beyond a certain fluence, knows as "saturation fluence", the upper energy levels are all populated and the material becomes transparent. Below a certain energy level, this energy quantity is absorbed and the low-amplitude parasitic signals 14 corresponding to the noise does not pass anymore. Only the high amplitudes of the amplified and time-stretched pulses 13 corresponding to the highest energies are transmitted by the saturable absorbent material.

The saturable absorbent materials thus operate to increase the pulse contrast, which can reach more that $10^{10}$. Examples are given hereinafter.

Any passive component having this property (absorption/saturation) is capable of operating.

The passive component can comprise several saturable absorbent materials placed one after the other in order to improve the contrast.

The energy of the amplified and time-stretched pulses 13 arriving at the saturable absorbent material has to be sufficiently high to reach the fluence or saturation intensity (about $10^9$ W/cm$^2$) and then to "actuate" said material. In the usual conditions, the required energy is reckoned at least 10 μJ. The peak intensity of these pulses has to be sufficiently low not to deteriorate the saturable absorbent material. That is why the initial light pulses 7 are amplified and time-stretched by the amplifying/time-stretching means 11, before arriving at the filtering means 12. Indeed, the pulse amplifying step allows to obtain a sufficiently high energy for "actuating" the saturable absorbent material. And the time-stretching step provides an increase of $\Delta\tau$ and thus a decrease of the peak power $E/\Delta\tau$ and of the peak intensity so as not to damage the saturable absorbent material.

The passing of the pulses through the second amplifying/time-stretching means 11 and the filtering means 12 does not involve non-linear effects on the spectrum, and thus does not affect the spectrum.

Filtered pulses 15 are obtained, which have the same characteristics as the amplified and time-stretched pulses 13, i.e. a duration of a few picoseconds and energies greater than 1 microjoule.

The filtered light pulses 15 then arrive at the first amplifying/time-stretching means 2.

Said filtered light pulses 15 are time-stretched by a time-stretching means 3 ("stretcher") up to durations comprised between a few tens of picoseconds and a few nanoseconds. This produces time-stretched light pulses 16, which can next be amplified by a regenerative amplifier 4 and a multipass amplifier 5 without risk for these latter to be deteriorated.

This produces time-stretched and amplified light pulses 17 having durations comprised between a few tens of picoseconds and a few nanoseconds and energies comprised between 1 mJ and several J.

The time-stretched and amplified light pulses 17 are then subjected to a reverse operation of time-compression through a compressor 6, which generates compressed light pulses 18 whose duration is close to the initial duration (a few femtoseconds), an energy greater than one millijoule and a contrast better that $10^8$.

FIG. 3 shows a comparison between a light pulse 21 obtained through an amplifying device according to the prior art and a light pulse 22 obtained through an amplifying device shown in FIG. 2.

In this example, the initial light pulses 7 are supplied by the generator 1 at a frequency of 80 MHz and have a duration shorter than 30 fs and an energy smaller than 5 nJ.

The second amplifying/time-stretching means 11 arranged at the output of the generator 1 is a multipass Ti-Sapphire amplifier comprising at least one dispersive element.

The successive passing of the initial light pulses 7 through said amplifier results, through time-dispersion, in a stretching of a few picoseconds of these pulses. This produces amplified and time-stretched pulses 13 having an energy of 10 µJ, a duration of a few picoseconds and a frequency of 10 Hz (electro-optical selection).

Such amplified and time-stretched pulses 13 then pass through the filtering means 12 comprising a saturable absorbent material RG850, which results in filtered pulses 15 having an energy of 5 µJ, a duration of a few picoseconds, a frequency of 10 Hz and only very few low-amplitude parasitic signals 14.

The filtered pulses 15 emerging from the saturable absorbent material are then time-stretched by the time-stretching means 3. This produces time-stretched light pulses 16 having an energy of 1 µJ, a duration of about 500 ps and a frequency of 10 Hz.

Such time-stretched light pulses 16 are pre-amplified by a regenerative amplifier 4. This produces stretched and pre-amplified light pulses 20 having an energy of 500 µJ to 2 mJ, a duration of 500 ps and a frequency of 10 Hz.

The stretched and pre-amplified light pulses 20 are next amplified by a multipass amplifier 5. This produces amplified pulses 17 having an energy greater than 20 mJ, a duration of 500 ps and a frequency of 10 Hz.

Such amplified pulses 17 are time-compressed by a compressor 6. This produces compressed pulses 18 having a duration close to that of the initial light pulses 7, i.e. about 30 fs, an energy of 20 mJ and a frequency of 10 Hz.

The contrast C is measured at the output of the compressor 6 by a third-order autocorrelator SEQUOIA.

A contrast C of about $10^8$-$10^{10}$ is obtained, as shown by the curve 22 in FIG. 3.

FIG. 3 shows various measurements of pulse contrast as a function of time (picoseconds). All the curves are normalized to 1.

Figure 1:
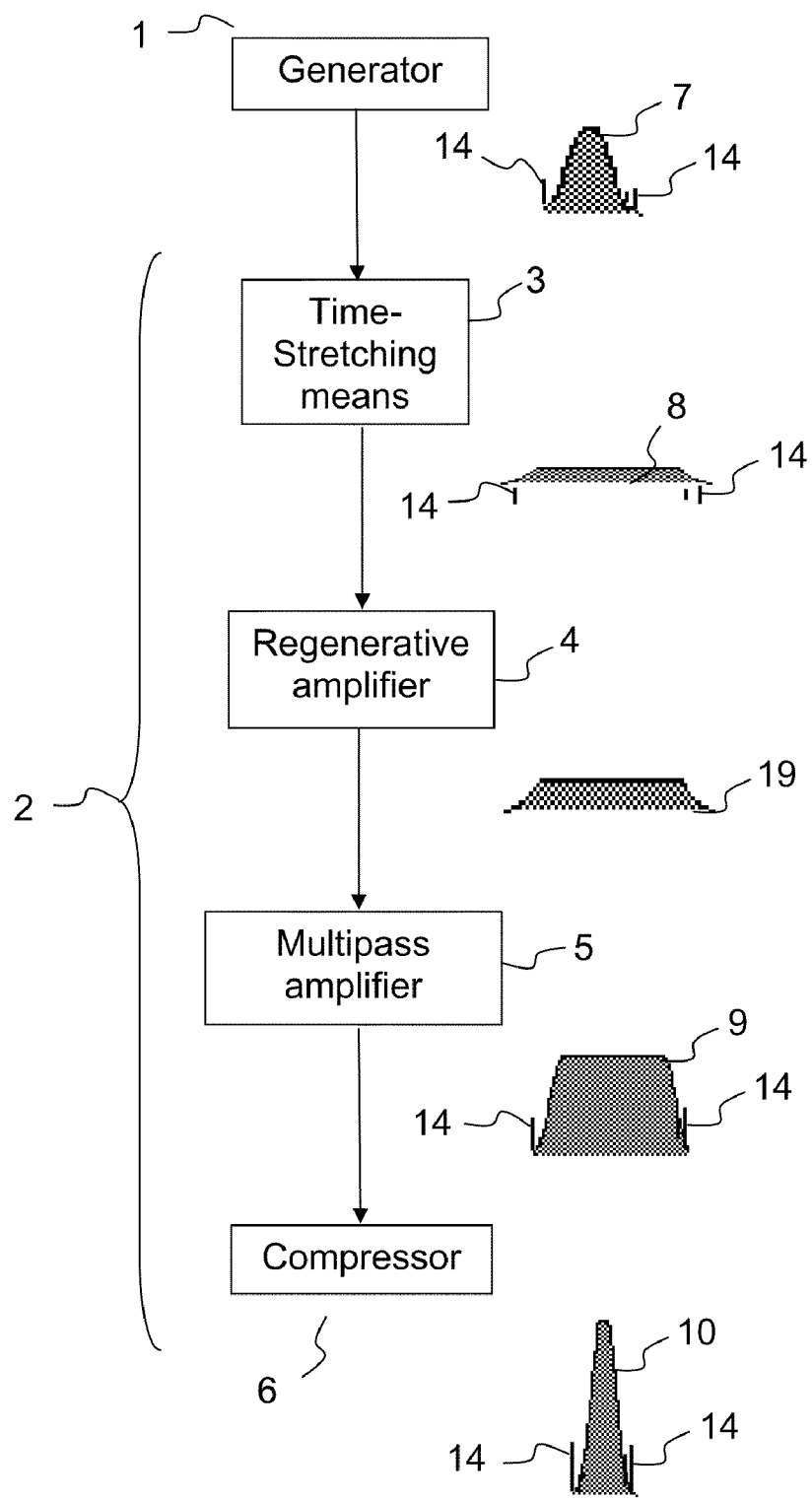
FIG. 1 shows a device for amplifying high-energy ultrashort light pulses according to the prior art.

The curve 21 shows the contrast of a pulse obtained from a light pulse amplifying device of the prior art described in FIG. 1, having neither filtering means 12 nor second amplifying/time-stretching means 11.

The curve 22 of FIG. 3 shows the contrast of a pulse 22 extracted from the compressed pulses 18 that have been filtered with a saturable absorbent material.

The pulses 21 and 22 have the same frequency (10 Hz) and the same duration. The intensity of the pulse 22 filtered with a saturable absorbent material (~$10^8$ a.u.) is greater than that of the pulse 21 not filtered with a saturable absorbent material (about 1.5 $10^6$ a.u.).

The contrast of the pulse 22 filtered with a saturable absorbent material ($10^8$) is also greater than that of the pulse 21 not filtered with a saturable absorbent material (about 1.5 $10^6$ a.u.).

The following comparative table gives contrast values obtained in the same conditions as those of the pulse 22 filtered with a saturable absorbent material (SA) and contrast values obtained in the same conditions as those of the pulse 21 without saturable absorbent material, for different pulse durations:

| Duration | 150 ps | 30 ps | 5 ps |
|---|---|---|---|
| Without SA | $10^7$ | $10^8$ | $5 \cdot 10^6$ |
| With SA | $3 \cdot 10^{11}$ | $5 \cdot 10^{10}$ | $5 \cdot 10^6$ |

The filtering means 12 can combine various known filtering means.

As mentioned above, the filtering means 12 can be made of one or more saturable absorbent materials, arranged in series, so as to increase the filtering effect, and therefore the contrast, but this improvement will be limited by the minimum energy needed to "drive" the saturable absorbent materials and the transmittance of these absorbent materials (50% maximum).

According to the preferred embodiment of the invention, the contrast is increased if the saturable-absorbent filtering means 12 is combined with a second compression means 23, followed by a so-called "non-linear" second filtering means 24. Such alternative allows to increase the contrast of three orders of magnitude or more. The non-linear filtering means 24 requires irradiances of the order of $10^{12}$ W/cm². It is then necessary that a second compression means 23 is inserted after the saturable-absorbent filtering means 12 to reach the required irradiances. FIG. 4 describes the principle of the preferred embodiment of the invention.

According to this preferred embodiment of the invention, the non-linear filtering means uses the method known as cross-polarization generation (XPW, for "Cross Polarized Wave") in a non-linear crystal [Minkovski et al. J. Opt. Soc. Am. B, vol. 21, no. °9, 1659-1664, 2004].

Just like the saturable absorbent material is an energy filter, the cross-polarization generation acts as a polarization filter. Beyond a given irradiance, the energy of a rectilinearly-polarized incident electromagnetic wave is transferred to the orthogonal polarization. Actually, the ASE-part of a short pulse, which does not contribute to the strong irradiances, is thus polarized perpendicular to the main pulse. Therefore, the ASE can be finally filtered using a polarizer. This phenomenon is induced in a cubic-symmetry non-linear crystal when that latter is subjected to strong irradiances. An intrinsic physical property of the non-linear crystal that is at the origin of this phenomenon, it is the susceptibility tensor of order 3, herein denoted "chi3". The phenomenon of orthogonal polarization generation pertains to the same family as the well-known phenomenons in the field of ultrashort lasers, such as the self-focusing or the self-phase modulation, all induced by the "chi3".

It is to be noted that, according to the invention, only one non-linear crystal is used and the incident pulse passes through this crystal only once. The irradiance of the output wave of the filtering device, denoted $I_{XPW}$, is proportional to the irradiance of the incident wave raised to the 3rd power, namely $I^3_{IR}$. As a non-linear crystal liable to act as a filtering means, the $BaF_2$ crystal in the crystallographic cut [101] or the $YVO_4$ crystal in the crystallographic cut [001] can be mentioned.

According to the preferred embodiment of the invention shown in FIG. 4, the generator 1 provides high-energy pulses 7 having an energy smaller than 20 nJ and of duration shorter than 40 fs.

Such pulses are time-stretched and amplified using a second amplifying/time-stretching means 11. According to the invention, the second amplifying/time-stretching means 11 comprises either a pulse stretcher or a material whose dispersive power is sufficient to provide a stretching compatible with the damage thresholds of the optical components. The stretching step is followed by the amplification through a multipass amplifier or a regenerative amplifier. The successive passages through the various optical components provide additional stretching. The pulses 13 obtained at the output of the second amplifying/time-stretching means 11 have an energy of 10 to 200 µJ and a duration of a few picoseconds. The pulses 13 are filtered by the saturable-absorbent filtering means 12. The pulses 15 issuing from the filtering means 12 are time-compressed by a second compression means 23. The compression means 6, 23 comprises either a prism system or a combination of a prism system with gratings.

FIG. 5 schematically shows a preferred embodiment of the filtering means (12, 24) according to the invention, the passive filtering means comprises at least one saturable absorbent material 12 and one XPW filtering module.

The second filtering means 24 comprises a XPW module comprising a focusing lens 27, a vacuum tube 31 (vacuum pressure of about 1 mbar) wherein a spatial filter 28 and a XPW crystal 29 are placed, and a polarizer 32 at the output of the tube 31. The spatial filter 28 is made of a block of silica in which a conical hole has been very accurately formed. The hole diameter varies from 100 to 600 µm according to the diameter of the initial beam 30. The incident radiation 30 is focused into the hole of the spatial filter 28. The spatial filter 28 is operable to eliminate the high spatial frequencies and, in fact, to smooth the spatial profile. The vacuum tube is operable to avoid ionization of air near the beam focusing point. An XPW crystal 29 is placed after the spatial filter 28 and, according to the energy of the incident beam, the position of the crystal 29 is adjusted with respect to the focus to optimize the intensity. According to the preferred embodiment of the invention, the XPW crystal is not located at the focus of the lens 12, but at a position where the spatially filtered beam is not focused.

In the prior art systems, a XPW crystal 29 is generally placed at the focus of a focusing lens, where the spatial distribution is much more homogeneous. Indeed, the XPW process is very dependent of the spatial profile of the incident beam, and the intensity inhomogeneities are liable to cause damage to the XPW crystal.

According to the invention, the saturable absorbent material can be placed before or after the XPW module. However, it is preferable to place the saturable absorbent material before the XPW module, insofar as the absorbent material also performs a spatial filtering.

The re-compressed pulses 19 have a duration close to the initial duration, namely less than 40 fs, and are injected through a focusing optical system in the non-linear filtering means 24. The efficiency of the filtering process is of 10% and the expected ASE-contrast improvement, which strongly depends on the extinction rate of the polarizer 32 placed at the output of the filtering means 24, is greater than $10^3$.

The curve 25 of FIG. 3 shows the contrast of a light pulse at the output of a system comprising a CPA and only one cross-polarization (XPW) filter. The curve 26 shows the contrast of a light pulse at the output of a system according to an embodiment of the invention, comprising a first filtering means 12 using a saturable-absorbent, and a second filtering means 24 using a cross polarization (XPW), such filtering means 12, 14 being located between two amplifying/stretching means. The contrast curve 26 of the pulse at the output of the system according to the invention is comprised between $10^{12}$ and $10^{13}$, which corresponds to the detection limit of the SEQUOIA autocorrelator used (solid line at $10^{-13}$).

The obtained pulses, shown on the curve 26, have an energy of a few microjoules, a duration shorter than 30 femtoseconds, and a contrast of 3-4 orders of magnitude greater that the initial pulses 19 issuing from the first filtering means 12. After the second filtering means 24, the amplification principle 2 stays unchanged.

The prior art amplified laser systems have typical contrasts of about $10^6$. Thanks to the preferred embodiment of the invention, ASE-contrast levels of $10^{13}$-$10^{14}$ can be reached.

The invention claimed is:

1. Device for amplifying high-energy ultrashort light pulses, said device comprising:
   a generator (1) supplying initial high-energy ultrashort light pulses (7),
   a first amplifying/time-stretching means (2), comprising:
   a time-stretching means (3) adapted to time-stretch light pulses to generate time-stretched light pulses (8, 16),
   a regenerative amplifier (4) pre-amplifying the time-stretched light pulses (8, 16) to generate stretched and pre-amplified light pulses (19, 20),
   a multipass amplifier (5) amplifying the stretched and pre-amplified light pulses (19, 20) to generate amplified pulses (9, 17),
   a compressor (6) time-compressing the amplified pulses (9, 17) to generate compressed pulses (10, 18) having a duration close to that of the initial light pulses (7), and
   a second amplifying/time-stretching means (11), arranged at the output of the generator (1), suitable for amplifying and time-stretching the initial light pulses (7) for generating amplified and time-stretched pulses (13), characterized in that it comprises:
   a first filtering means (12) comprising a passive component, said passive component comprising at least one saturable absorbent material, said first filtering means (12) being arranged between the second amplifying/time-stretching means (11) and the first amplifying/time-stretching means (2), suitable for blocking the low-amplitude light signals (14) of the amplified and time-stretched pulses (13), and
   a second compression means (23), arranged after the first filtering means (12), and a second filtering means (24) arranged after the second compression means (23), said second filtering means (24) comprising a non-linear crystal (29) suitable for transferring a part of the energy of the compressed pulses (19) to a cross-polarization (XPW) and a polarizer (32) suitable for filtering said polarization.

2. Device for amplifying light pulses according to claim 1, characterized in that the saturable absorbent material is chosen among a CdSe-, CdTe- or CdSeTe-doped glass or a cell of liquid organic dye comprising $C_{29}H_{33}N_2I$ (or HITC).

3. Device for amplifying light pulses according to claim 1, characterized in that the second amplifying/time-stretching means (11) is a multipass amplifier.

4. Device for amplifying light pulses according to claim 3, characterized in that the multipass amplifier comprises a dispersive element.

5. Device for amplifying light pulses according to claim 4, characterized in that the dispersive element is a $TeO_2$ crystal.

6. Device for amplifying light pulses according to claim 1, characterized in that the second amplifying/time-stretching means (11) is a chirped pulse amplifier.

7. Device for amplifying light pulses according to claim 2, characterized in that the second amplifying/time-stretching means (11) is a multipass amplifier.

8. Device for amplifying light pulses according to claim 2, characterized in that the second amplifying/time-stretching means (11) is a chirped pulse amplifier.

9. Device for amplifying light pulses according to claim 3, characterized in that the second amplifying/time-stretching means (11) is a chirped pulse amplifier.

* * * * *